United States Patent [19]

Hamilton

[11] Patent Number: 5,026,248
[45] Date of Patent: Jun. 25, 1991

[54] HYDRODYNAMIC SWING DAMPER AND TREE HANDLING VEHICLE INCORPORATING THE SAME

[75] Inventor: Douglas D. Hamilton, Town of Mount Royal, Canada

[73] Assignee: Logging Development Corporation, Montreal, Canada

[21] Appl. No.: 389,687

[22] Filed: Aug. 4, 1989

[30] Foreign Application Priority Data

Mar. 17, 1989 [CA] Canada .................................. 594167

[51] Int. Cl.⁵ .............................................. B66C 11/00
[52] U.S. Cl. .................................... 414/729; 188/282; 188/299
[58] Field of Search ........................ 414/729, 738, 739; 294/119.4; 188/279, 300, 319, 282, 322.15, 302, 310

[56] References Cited

U.S. PATENT DOCUMENTS 4,493,659  1/1985  Iwashita ........................ 188/300 X
4,524,851  6/1985  Sawano et al. ..................... 188/134
4,553,778  11/1985  Tyer ............................... 294/119.4
4,846,317  7/1989  Hudgens ............................ 188/299

Primary Examiner—Robert J. Spar
Assistant Examiner—Donald W. Underwood
Attorney, Agent, or Firm—Stanley E. Johnson

[57] ABSTRACT

A swing damper and a swing damper in one or more pivot joints, suspending a work tool such as a grapple from a boom. The swing damper is a hydraulic pivot joint where pivoting at the joint causes movement of a piston, in a closed chamber, that separates the chamber into first and second inter-related variable volume chamber portions. Upon movement of the piston, fluid is forced through a restricted opening from one chamber portion to the other with the amount of restriction determining the degree of damping. The piston is moved linearly in the chamber by a motion translating means operatively interconnecting the pivot shaft and piston. The motion translating means preferably is a screw thread on the shaft mating with a threaded aperture in the piston. Rods pass through the piston preventing it from rotating in the chamber.

21 Claims, 4 Drawing Sheets

HYDRODYNAMIC SWING DAMPER AND TREE HANDLING VEHICLE INCORPORATING THE SAME

FIELD OF INVENTION

This invention relates to an improved link mechanism for suspending a work assembly such as a grapple, tree processing head or the like from the free outer end of a boom and to a tree handling vehicle incorporating such link mechanism. The invention particularly concerns improvements for restraining pivoting motion at one or the other of both pivot axis which are right angles to one another in the link mechanism that suspends the work tool from the boom.

BACKGROUND OF THE INVENTION

In some tree handling equipment, a work unit depends from the free outer end of a boom and is connected thereto by a link that pivots about two axis perpendicular to one another. These link mechanisms normally permit the work unit to pivot freely on the two axes. The term tree handling equipment herein is used to include boom mounted grapples for handling trees, boom mounted processing heads, grapple type skidders and the like. It will be obvious from the description to follow hereinafter, the swing damper of the present invention can have other enviromental uses not related to tree handling equipment.

The main purpose of the two axis link, in for example a grapple depending from a boom, is to allow the grapple to freely position itself during the grappling maneuver. This, from use, has been found to produce the most efficient result. In the case of a processing head suspended from a boom, the link permits free fall of the tree in processing heads where the felling function is also included. During the processing operation, the felling head is free to react to the changing location of the trees centre of gravity, following the change in tilt of the tree as the tree is propelled endwise in a generally horizontal attitude that changes during processing. The free pivotal movement of the processing head avoids prying or bending action which might damage the head or have an adverse affect on the feed function.

There are, however, problems associated with freely pivoted work units on a boom and particularly when the boom and/or boom mounted vehicle is being maneuvered. For example, in the case of a boom mounted grapple, maneuvering of the boom can cause wild swinging action of the work unit which inhibits or slows down productivity. In the case of a grapple type skidder, the grapple has a tendency to swing wildly on its pivots during the travel phase of the vehicle when the grapple is empty. This not only generates substantial noise, but also causes destructive impacts on the vehicle itself and/or grapple.

As indicted in the foregoing, the pivotal connections between the work tool and the boom, particularly on tree handling and tree processing equipment, have been nothing more than pin connections allowing free pivotal rotation which has draw back of allowing the work tool to oscillate wildly during rapid movements of the boom required for operating efficiency in the field. It is therefore desirable to have some means to damp or restrain movement of the work unit. Known methods of controlling the swing movement involve the use of mechanical friction devices which may be variously adjustable by, for example, tightening a nut on the pivot pin mounting or by grease injections. Another known method involves the use of a control cylinder that actuates brake shoes. All require frequent adjustment to compensate for wear and frequent replacement of worn components. Because of the wear, the swing dampening effect varies widely and the devices have generally proven unsatisfactory.

SUMMARY OF INVENTION

A principal object of the present invention is to provide a relatively maintenance free, (controllable and adjustable if desired), swing damper. The damping effect can be adjusted in relation to motion characteristics to limit the swing and by remote control, can be locked preventing swing for precise positioning of the attachment.

A further object of the invention is to provide a relief valve system which can be used to set the maximum damping reaction of the device and at the same time limit the internal hydraulic pressure.

A still further object of the invention is to provide two damping assemblies rigidly interconnected at right angles to one another and means for attaching one assembly to the boom and the other to the working assembly.

In keeping with the foregoing objects there is provided in accordance with one aspect of the present invention a device for use in pivotally interconnecting respectively first and second members comprising a housing securable to said first member and having a fluid confining chamber therein; a piston reciprocally mounted in said chamber separating such chamber into first and second chamber portions; a fluid flow path from one to the other of said first and second chamber portions, fluid flow control means in said flow path restricting movement of fluid from one chamber portion to the other; a shaft pivotally mounted on said housing and securable to said second member; and motion translating means operatively connected to said piston and shaft whereby relative movement of said first and second members through pivoting about their pivotal interconnection causes linear movement of the piston forcing fluid from one to another of said first and second chamber portions.

In accordance with a further aspect of the present invention there is provided a tree handling apparatus comprising a mobile vehicle having a boom mounted thereon; a work tool; and pivot means connecting said work tool to said boom, said pivot means including a hydraulically damped pivot joint restraining oscillatory movement of the work tool resulting from movement of the vehicle and/or boom, said pivot joint including a housing secured to one or the other of said boom and work tool and a shaft journalled on said housing and secured to the other, said shaft projecting into a chamber in said housing and having an external screw thread thereon, a piston in said chamber threaded on said shaft and separating said chamber into first and second chamber portions, fluid flow passage means within said housing providing liquid flow communication between said first and second chamber portions and means in said passage means restricting the flow rate therethrough.

BRIEF DESCRIPTION OF THE DRAWINGS

The invention is illustrated by way of example in the accompanying drawings wherein.

DESCRIPTION OF PREFERRED EMBODIMENT

Figure 1:
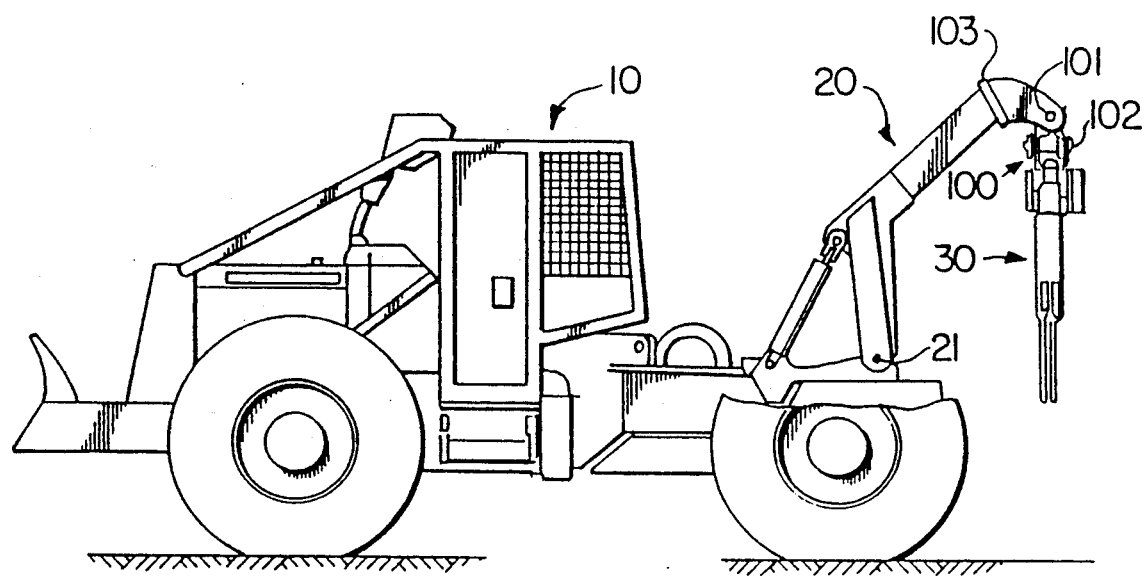
FIG. 1 is a side elevational view of a grapple type tree skidder having a swing damper provided in accordance with the present invention connecting the grapple to the boom.

Referring to FIG. 1, there is illustrated a grapple skidder of the type more fully disclosed in U.S. Pat. No. 3,782,567 issued Jan. 1, 1974. The grapple skidder comprises a powered mobile unit 10 having a boom 20 pivotally mounted thereon as at 21 and suspended from the free outer end of the boom 20 is a grapple 30. The vehicle, if desired, may have a bunk on it for supporting one end of the trees during skidding and if desired, operative in conjunction with the grapple providing an abutment reactive to forces on the grapple caused by skidding as known in the art.

In accordance with the present invention, the grapple 30 is connected to the boom by a link mechanism 100 providing two pivot axis at right angles to one another provided by respective shafts 101 and 102. Pivotal movement about the axis of the respective shafts is damped, restricting oscillatory movement about each of the pivot axes that are at right angles to one another. While dampening is disclosed about each pivot axis, it is to be understood that if so desired, dampening can be provided about one or the other, or both pivot axis. The dampening device of the present invention is based on the principle of a helical rotary actuator, but with actuation reversed, i.e. instead of having the piston driving the shaft, the shaft drives the piston. In addition, instead of an external hydraulic power feed as is the case with rotary actuators, there is an internal closed loop with fluid shifted from one side to the other of a piston as the piston is caused to move by rotation of the shaft. Flow of fluid from one side of the piston to the other is directed through a fixed orifice (or variable orifice as may be desired) which causes a back pressure resisting movement of the piston which in turn resists shaft rotation and thus, resists oscillation of the attachment. In a universal joint type of coupling there is one hydraulic dampening unit on each shaft at right angles to one another.

Figure 2:
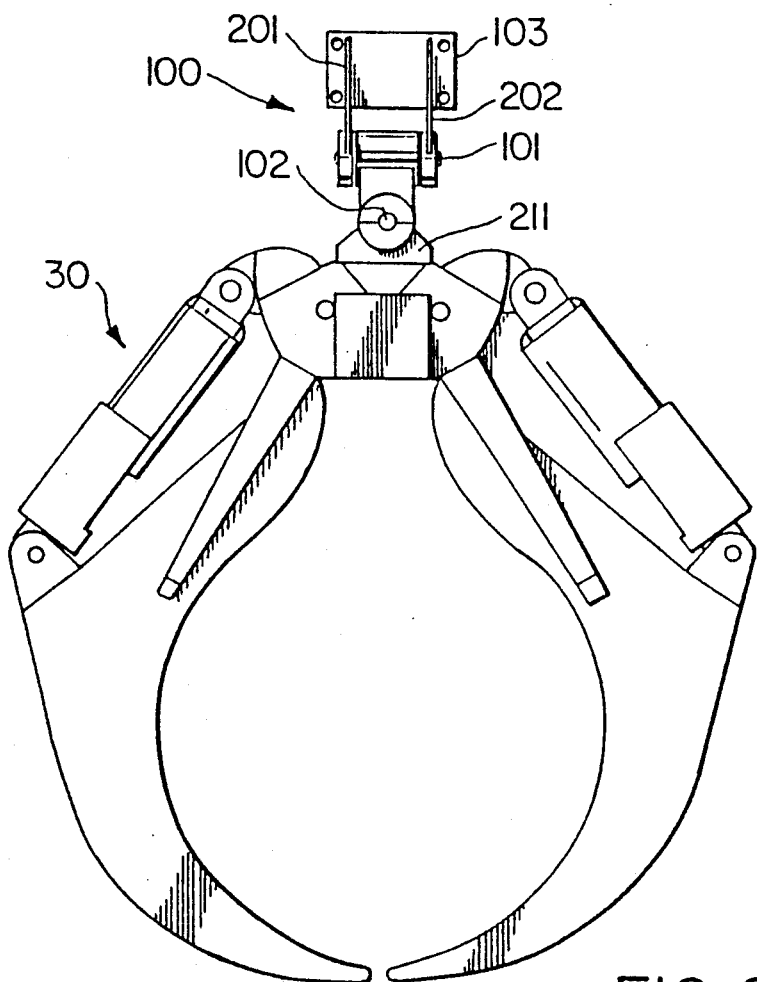
FIG. 2 is partial righthand elevational view of FIG. 1.

Referring to FIGS. 1 and 2, the mounting unit 100 is attached to the boom 20 by a mounting plate 103 and to the grapple (or other working assembly) by a pair of plates 210, 211 fixed as by welding or other suitable means to the working assembly. These attachment means are preferred for reasons to follow, but can obviously be varied as circumstances dictate. The most essential part of unit 100 is the intervening portion between couplings 103 and 211 which comprises (as in the embodiment illustrated in FIGS. 2, 3 and 4) two hydraulically damped pivot units 100A and 100B having respective pivot shafts 101 and 102. Pivot units 100A and 100B are disposed at right angles to one another and rigidly interconnected as by, for example, two or more gusset plates 111.

Figure 4:
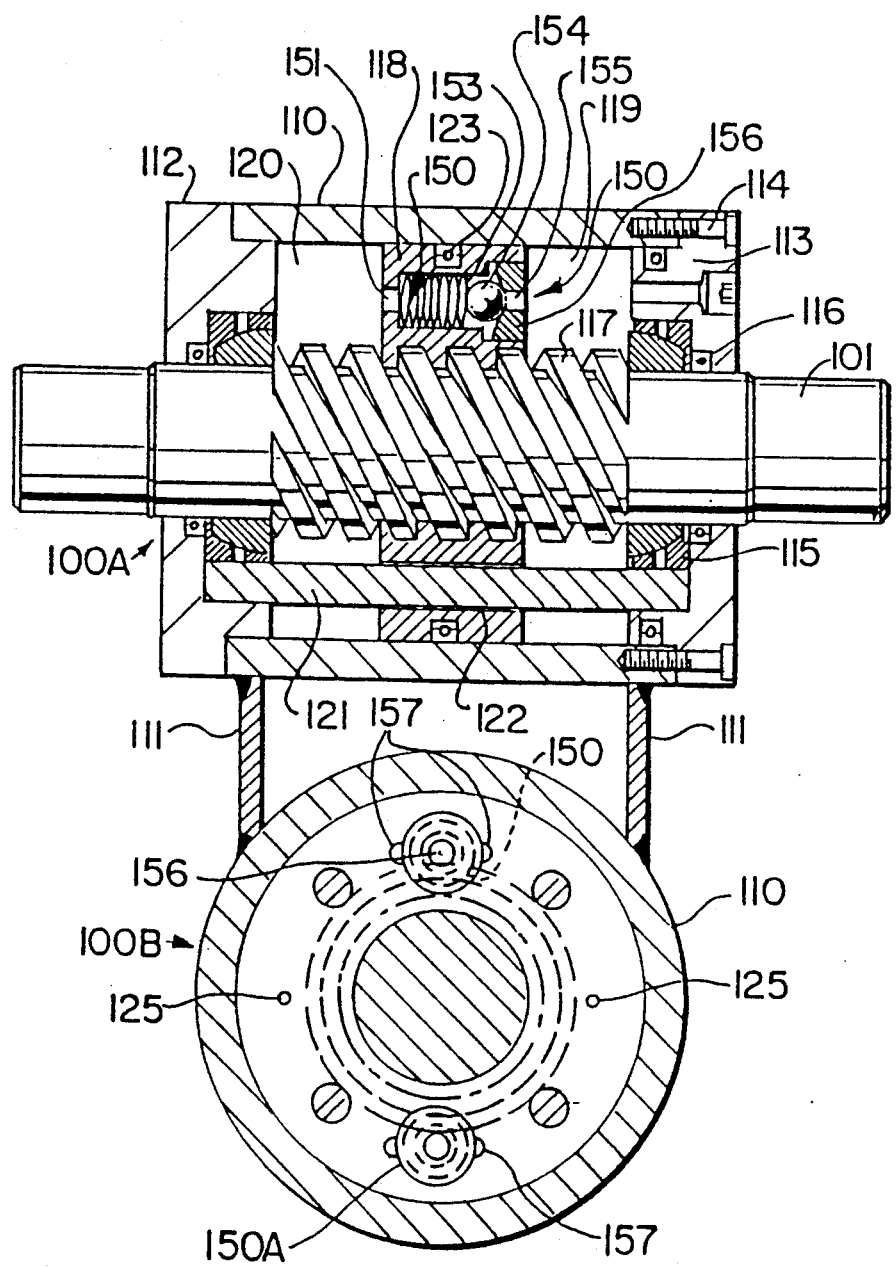
FIG. 4 is a sectional view taken essentially along line 4—4 of FIG. 3.

The pivot units 100A and 100B are identical in construction and operation and the internal mechanism of one is clearly illustrated in FIG. 4. Referring to FIG. 4, each pivot unit has a cylindrical housing 110 closed at opposite ends by respective end caps 112 and 113. End cap 112 may be attached to the housing as by welding or detachably secured thereto as is end cap 113 by a plurality of countersunk threaded studs 114. Each end cap 112 and 113 is fitted with a bearing 115 and a shaft seal 116. Shafts 101 and 102 of respective pivot units 100A and 100B are carried by these bearings and the portion of the shaft between such bearings is externally threaded as indicated by the reference numeral 117. A piston 118 is reciprocally mounted in the housing 110 separating the housing internally into a pair of fluid confining chamber portions 119 and 120. The piston has a central aperture therethrough which is threaded to match the threads on the shaft. The piston 118 is restricted to linear movement by one or more rods 121 anchored at opposed ends in the respective end caps and which pass through, in close fitting relation, an aperture 122 in the piston. When the shaft 101 (or 102 as the case may be) is rotated, piston 118 is caused to move in a linear path axially within the housing assembly, forcing fluid by way of appropriate passage means from one chamber portion to the other. Piston 118 is sealed against the housing by one or more piston rings or O-seals 123.

Figure 6:
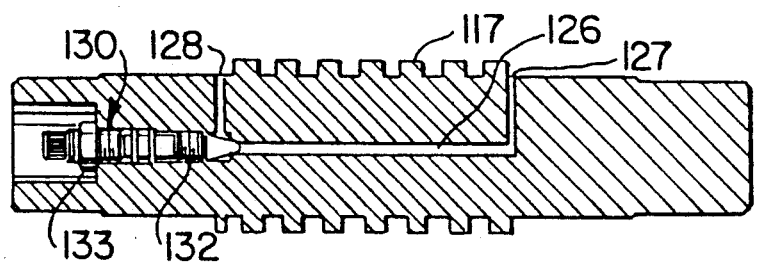
FIG. 6 and 7 are optional shaft arrangements which incorporate motion control devices for the hydrodynamic swing damper.
Figure 7:
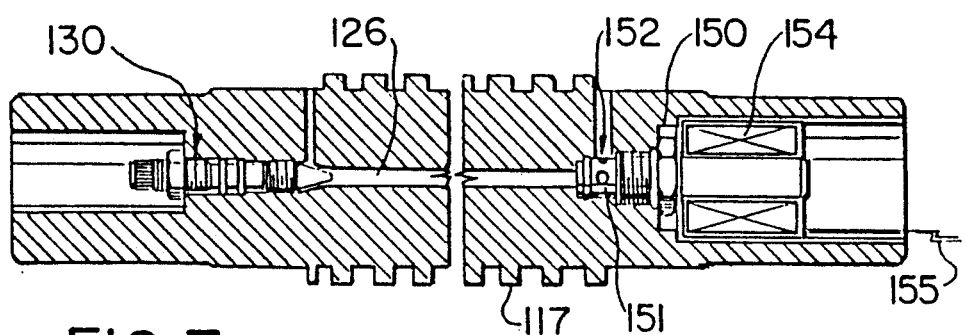

Fluid flow from one chamber portion to the other is, in the embodiment of FIG. 4, through one or more holes 125 through the piston and in the embodiment of FIGS. 6 and 7, through a passageway 126 in the shaft. If desired, the passage means can be provided by a predetermined clearance between the piston 118 and cylinder wall and/or between the threads on the shaft and mating threads in the piston such as to provide leakage at a selected rate taking into account the characteristics of the liquid being (or to be) used.

The number and size of orifices 125 through the piston are predetermined to meet specific requirements. In operation the housing is filled with oil or other suitable liquid, semi-liquid or fluid and, in response to rotation of the shaft, is forced through the orifice(s) from one chamber portion to the other. The resulting back pressure opposes motion of the piston and shaft and thus, provides the damping effect. A liquid or grease normally fills the chamber portions and which essentially is non-compressible. A partially compressible substance may in some instances be desirable or in some installations, a compressible fluid such as air could be used.

In the embodiment illustrated in FIG. 4, two pressure relief valves 150 are provided in the piston 1 permitting, upon reaching overpressure, flow from chamber portion 119 to chamber portion 120 and the other flow in the opposite direction. One of the pressure relief valves 150 is shown in cross-section in FIG. 4 and comprises an aperture 151 through the piston and which has an enlarged cylindrical portion 152 wherein there is located a compression spring 153. Compression spring 153 bears against a ball 154 covering an aperture 155 in a cap 156 threaded, press fit or otherwise secured in an enlarged portion of the cylindrical bore 152.

The compression spring 153, in the embodiment shown in FIG. 4, is a series of dish shaped disks, stacked in a repeating series of pairs where in each pair the concave dish faces are in face-to-face relation. Each dish shaped disc has a central aperture 156 and fluid flow is by way of one or more channels 157 in the side wall of the cylindrical bore 152. The overpressure, one-way flow valve shown in section in FIG. 4 allows fluid flow from chamber portion 119 to chamber portion 120. The other one-way valve shown in the lower portion of FIG. 4 and designated 150A allows fluid flow in the opposite direction. The relief valves set the maximum pressure and thus, maximum damping effect of the device. The relief pressure can be adjusted by moving the retaining cap 156 into or out of the cylindrical bore and where such cap is threaded into the bore, this can be done by turning the cap.

An alternative fluid flow passage means is illustrated in FIGS. 6 and 7, and consists of a fluid passageway 126 extending axially along the shaft and having extending therefrom radial passageways 127 and 128, terminating in respective ones of chamber portions 119 and 120 as for example, illustrated in FIG. 4. The rate of flow through the passageway 126, 127, 128 is selectively variable by way of an adjustable needle valve 130 installed in the shaft so as to vary the restriction to flow at position 131. The needle valve 130 is threaded into the shaft as at 132 and the location of the needle can be locked by way of a lock nut 133. FIG. 7 illustrates the same arrangement and in addition to the variable needle valve includes a remotely controllable shut-off valve 180. The valve 180 illustrated is a reciprocal plunger 181, moveable selectively to open and close the fluid flow passage at position 182. The plunger valve is shown as being electrically operated through the use of a solenoid 184, connected by way of leads 185 to a switch(s) at a remote location for actuation. Closing of the fluid flow passage obviously locks the work tool in position by preventing fluid flow from one to the other of chamber portions 309 and 308. It will be obvious the shut-off valve 180 can be used by itself without the adjustable throttling valve 130.

Figure 3:
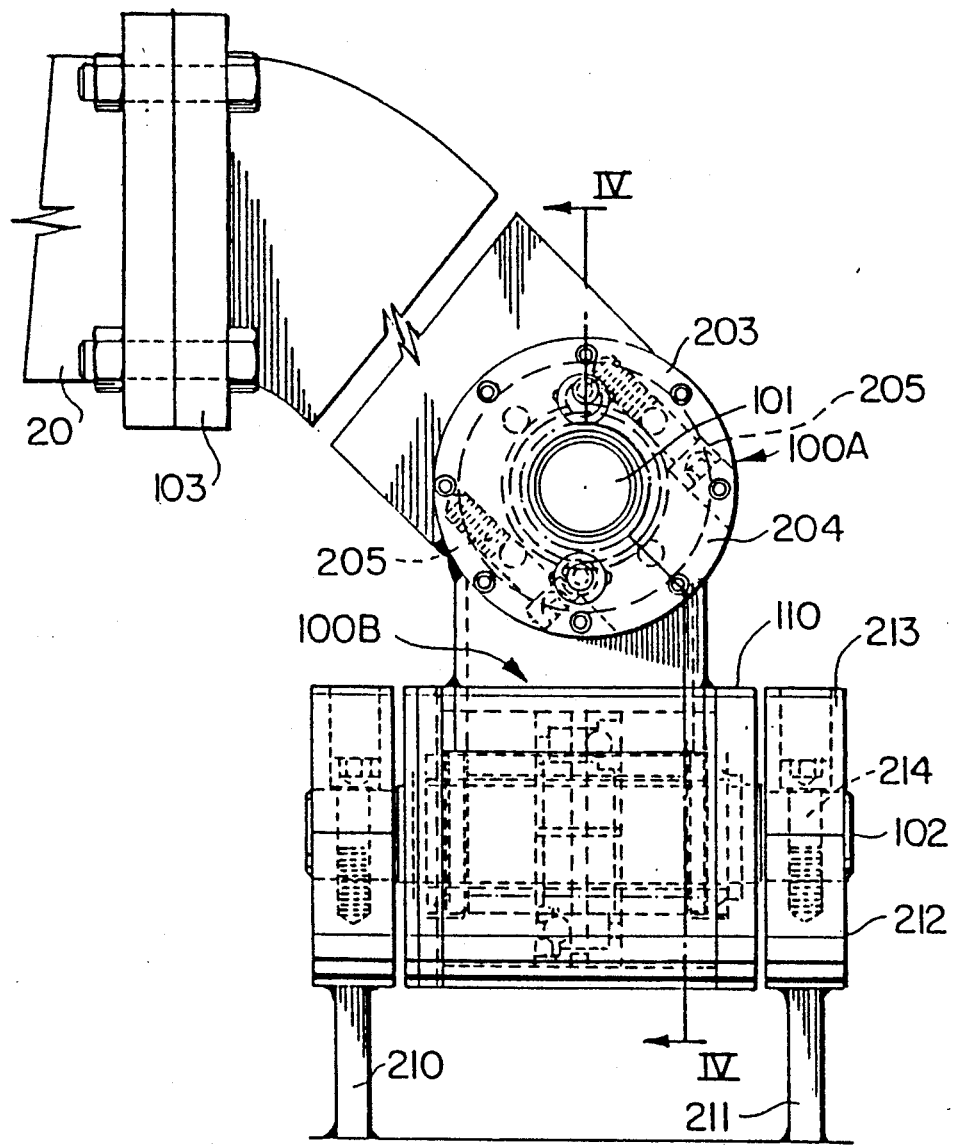
FIG. 3 is an enlarged view of the swing damper.

Referring now particularly to FIGS. 2 and 3, it will be noted unit 100A is connected to the boom mounting plate 103 by a pair of flanges 201 and 202, each of which has a saddle 203, co-operating with a removable cap 204 that clampingly engages the shaft 101. The cap 204 is fastened to the saddle by a pair of countersunk threaded studs 205. The studs 205 can be used to vary the frictional engagement force with the shaft, such that there is provided, if desired, a slip-joint designed to take overloads which otherwise might damage the coupling unit. This is a safety feature which, if desired, can be used in place of the previously described overpressure valves 150 or as a supplement thereto. Similarly the unit 100B is connected to the working assembly by a pair of flanges 210, 211, each of which has a saddle 212 and a detachable cap 213 for clampingly engaging the shaft 102. Cap 213 is fastened to the saddle 212 by a pair of countersunk set screws 214. As indicated earlier, this type of mounting is preferred but obviously can be varied as circumstances dictate.

Figure 5:
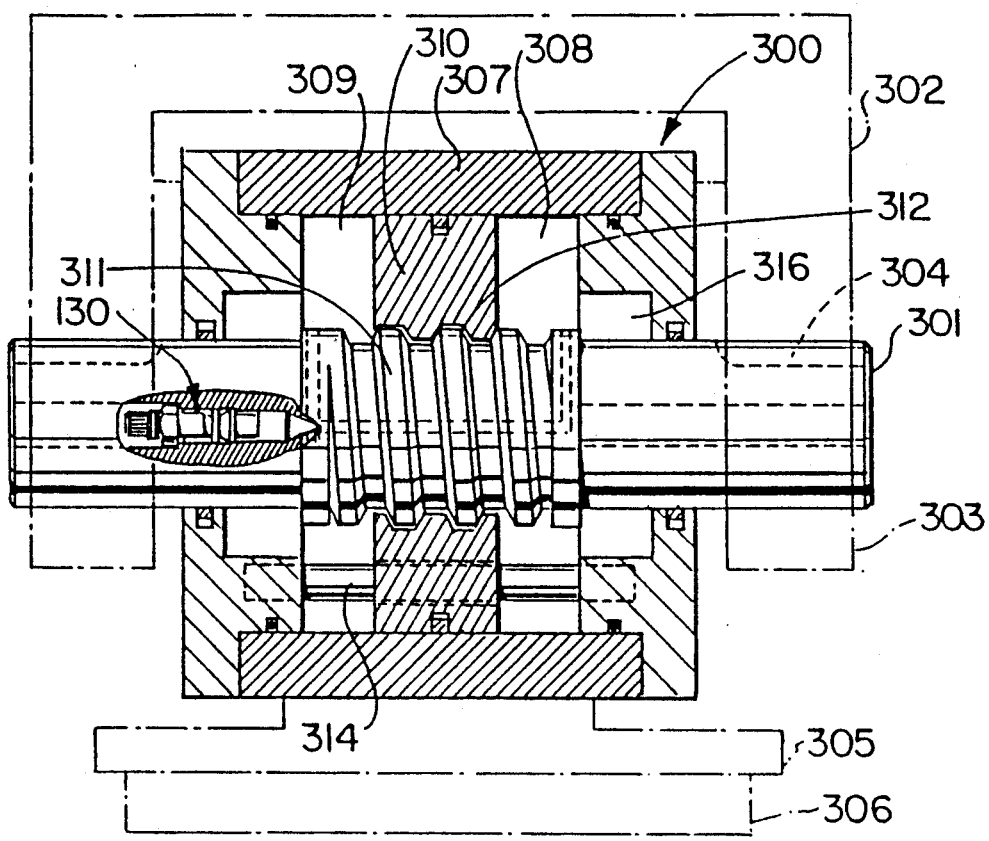
FIG. 5 is a sectional view, similar to a portion of FIG. 4, illustrating a modified embodiment.

FIG. 5 illustrates a single damped pivot joint 300 having the shaft 301 thereof detachably connected to a boom 302 by a pair of removable end caps 303. The caps are removably mounted as by threaded studs in the same manner as for example described with reference to FIG. 3, but in this instance rotation of the shaft is prevented by use of a woodruff key 304. The housing of the unit 300 is attached as by way of, for example, a mounting plate 305 to a work tool unit 306.

The swing damper 300 has a shaft therein of the type illustrated and described with reference to FIGS. 6 and 7. Referring specifically to FIG. 5, shaft 301 is splined or keyed and being rigidly secured to the boom is the stator and housing 307 fastened to the work tool is the rotor. The housing has an internal chamber divided into two chamber portions designated respectively 308 and 309 by a piston 310. The shaft is machined or otherwise formed with a helical gear portion 311 that mates with a threaded aperture 312 through the piston. A series of rods 314 extend from one end to the other of the chamber and are anchored to the housing passing through the piston, allowing the piston to move along the helical section, but prevent it from rotation. The shaft is supported by bearings 316, capable of carrying both radial and thrust loads. In the embodiment illustrated, the housing 307 is a cylindrical tube and the bearings fit into end caps detachably secured to the housing as by plurality of studs, bolts or the like. Seals are located as required. The housing may be non-circular in cross-section, i.e. square with a correspondingly shaped piston, such configuration preventing rotation of the piston and thereby eliminating any need for guide rods such as rods 314.

The hydraulic damper of FIG. 5 located at one pivot joint may, for example, dampen oscillations of a tree processing head when, for example, a boom is swinging and suddenly stops. In such instance, the momentum of the felling head would cause the housing to rotate and since the piston is forced to rotate as well, it would move longitudinally along the threaded shaft forcing fluid from one chamber portion to the other. Since fluid flow is through a restricted opening, movement is restrained providing the selected damping action.

From the foregoing it is clearly evident the hydraulic damped joint may be used at one or the other or both pivot joints in a link that connects the work tool to a boom. In the embodiment illustrated, for example in FIG. 7, movement can be prevented locking the work unit in a fixed position which might be desirable. In some instances, for example in processing trees it can be desirable to lock the processing head so as to remain in a fixed attitude position.

I claim:

1. Improvements in dampening oscillation of a work tool suspended from a boom comprising at least one hydraulically damped pivot joint connecting said work tool to said boom, said pivot joint including a housing fixed to one or the other of the boom and work tool suspended therefrom; a chamber in said housing, a piston reciprocally mounted in said chamber and separating the same into first and second inter-related variable volume chamber portions; a shaft pivotally mounted on said housing and connected to the other of said boom and work tool, motion translating means comprising a screw thread of selected pitch on a portion of said shaft in said chamber and internal thread means on an aperture through said piston mating with said threaded portion of said shaft whereby said piston moves linearly along the shaft in response to rotation of such shaft in response to pivotal relative movement at said joint between the boom and the work tool; means preventing rotation of said piston; a fluid flow passage from one to the other of said first and second chamber portions and means restricting the rate of flow through said passage means.

2. The improvement as defined in claim 1, including means to selectively adjust the flow rate capacity through said passage means.

3. The improvement as defined in claim 1, wherein said piston is circular in outline configuration and wherein said rotation preventing means comprises at least one rod fixed to the housing and projecting through a hole in said piston, said at least one rod being at a position offset from and parallel to said shaft.

4. A tree handling apparatus comprising:
(a) a mobile vehicle having a boom mounted thereon;
(b) a work tool; and
(c) pivot means connecting said work tool to said boom, said pivot means including a hydraulically damped pivot joint restraining oscillatory movement of the work tool resulting from movement of the vehicle and/or boom, said pivot joint including a housing secured to one or the other of said boom and work tool and a shaft journalled on said housing and secured to the other, said housing having a chamber with said shaft projecting thereinto, an external screw thread on said shaft in said chamber, a piston threaded on said shaft and separating said chamber into first and second interrelated variable volume chamber portions, means preventing rotating of said piston in said chamber whereby relative movement of said housing and shaft cause said piston to move linearly along said shaft, fluid flow passage means within said housing providing liquid flow communication from one to the other of said first and second chamber portions and means in said passage means restricting the flow rate therethrough whereby relative movement of said shaft and housing is dampened.

5. Tree handling apparatus as defined in claim 4 including a pair of said pivot joints interconnected in the form of a universal joint with the pivot axis of one pivot joint being substantially at right angles to the pivot axis of the other.

6. A device for use in pivotally interconnecting respectively first and second members comprising:
a housing securable to said member and having a fluid confining chamber therein; a piston reciprocally mounted in said chamber separating such chamber into first and second interrelated variable volumn chamber portions, said piston having a threaded aperture extending therethrough along the axis thereof;
a fluid flow path from one to the other of said first and second chamber portions;
fluid flow control means in said flow path allowing a predetermined rate of flow of a selected fluid from one chamber portion to the other;
a shaft pivotally mounted on said housing and securable to said second member; and
motion translating means comprising external threads on said shaft mating with said threaded aperture axially through said piston and means preventing rotation of said piston about its axis whereby relative movement of said first and second members, through pivoting about their pivotal interconnection, causes linear movement of the piston in a direction along its axis forcing fluid from one to another of said first and second chamber portions, said flow control means restricting said fluid flow whereby relative movement of said first and second members is dampened.

7. A swing damping means for pivotally interconnecting respectively first and second members such as, for example, a boom and a work tool suspended therefrom comprising:
(a) a cylindrical housing rigidly securable to said first member;
(b) end caps on said housing providing a fluid confining chamber therebetween, at least one of said end caps being detachably secured to said housing;
(c) a shaft extending through said chamber and journalled on said end caps, said shaft having opposite end portions, extending beyond said end caps that are securable to said second member, said shaft having a threaded portion disposed between said end caps and concentric with the longitudinal axis of the housing, said shaft providing said pivotal interconnection of said first and second members;
(d) a cylindrical piston threaded on said shaft and disposed in sealing engagement with said cylindrical housing separating said chamber into first and second inter-related variable in volume chamber portions respectively on opposite sides of the piston;
(e) means preventing rotation of said piston whereby relative movement of said first and second members causes said piston to move axially along said threaded shaft; and
(f) fluid flow passage means from one to the other of said chamber portions including means therein, allowing a predetermined rate of flow of a selected liquid from one chamber portion to the other to dampen relative movement of said first and second member.

8. a swing damping means for use in pivotally interconnecting a first and second member, for example, a boom and work tool comprising:
(a) a cylindrical housing having a cylindrical chamber closed at respective opposite ends by end caps;
(b) a shaft extending through said chamber and journalled for rotation on said end caps, said shaft being located on the longitudinal axis of said chamber and extending beyond and carried by said end caps, said shaft having a threaded portion in said chamber between said end caps;
(c) a cylindrical piston, threaded on said shaft and sealed against the cylindrical chamber separating the same into first and second inter-related variable volume chamber portions;
(d) means connecting said piston to the housing preventing rotation of the piston and allowing linear movement only of the piston in a direction along the axis of the chamber;
(e) fluid flow passage means including means restricting the rate of flow of fluid from one to the other of said chamber portions respectively on opposite sides of the piston; and
(f) means rigidly securing said housing and shaft to said respective first and second members, relative movement of said first and second members causing said piston to move axially in said housing against the resistance to fluid flow thereby dampening relative movement of said first and second members.

9. A swing damping means as defined in claim 1 wherein said fluid flow passage means comprises at least one hole through said piston.

10. A swing damping means as defined in claim 1 wherein said fluid flow passage means comprises a channel through said shaft, extending from one of said chamber portions to the other.

11. A swing damping device as defined in claim 10 including means selectively to vary the rate of flow of a selected fluid through said channel.

12. A swing damping means as defined in claim 11 including a remotely operable shut-off valve selectively to preclude flow of fluids through said channel.

13. A swing damping means as defined in claim 9 including at least one pressure relief valve in the piston, limiting maximum pressure in at least one of said chamber portions and discharging into the other.

14. A swing damping means as defined in claim 1 wherein said fluid flow passage means comprises predetermined leakage between at least one of the piston and wall of the cylindrical chamber and the threaded engagement of the piston with the shaft.

15. Improvements in dampening swinging movement of a work tool suspended from a movably mounted boom comprising at least one hydraulically damped pivot joint connecting said work tool to said boom, said pivot joint including a housing secured to one of a frame mounting structure of said work tool and said boom and having a chamber therein, a piston reciprocally mounted in said chamber and separating the same into inter-related variable volume fluid confining chamber portions, a shaft extending axially through said piston and chamber and secured to the other of said boom and frame mounting structure of the work tool, means preventing rotation of said piston relative to said housing, gear thread means on said shaft mating with a threaded bore axially through said piston whereby relative movement of said work tool and boom causes said piston to move linearly along the shaft forcing fluid in one of said chamber portions to the other of said chamber portions and fluid flow passage means including flow control means therein permitting restricted flow of the fluid from one to the other of said chamber portions and thereby dampening relative movement of said work tool and boom.

16. A swing damping means as defined in claim 15 wherein said fluid flow passage means comprises at least one hole through said piston.

17. A swing damping means as defined in claim 15 wherein said fluid flow passage means comprises a channel through said shaft, extending from one of said chamber portions to the other.

18. A swing damping device as defined in claim 17 including means selectively to vary the rate of flow of a selected fluid through said channel.

19. A swing damping means as defined in claim 17 including a remotely operable shut-off valve selectively to preclude flow of fluid through said channel.

20. A swing damping means as defined in claim 15 including at least one pressure relief valve in the piston, limiting maximum pressure in at least one of said chamber portions and discharging into the other.

21. A swing damping means as defined in claim 15 wherein said fluid flow passage means comprises predetermined leakage between at least one of the piston and wall of the cylindrical chamber and the threaded engagement of the piston with the shaft.

* * * * *